(12) United States Patent
Qiao

(10) Patent No.: US 9,744,601 B2
(45) Date of Patent: Aug. 29, 2017

(54) DRILL CHUCK

(71) Applicant: Shandong Weida Machinery Co., LTD, Wendeng (CN)

(72) Inventor: Wenzhang Qiao, Wendeng (CN)

(73) Assignee: Shandong Weida Machinery Co., LTD, Wendeng (CN)

( * ) Notice: Subject to any disclaimer, the term of this patent is extended or adjusted under 35 U.S.C. 154(b) by 337 days.

(21) Appl. No.: 14/400,706

(22) PCT Filed: Jul. 31, 2013

(86) PCT No.: PCT/CN2013/080562
§ 371 (c)(1),
(2) Date: Feb. 11, 2015

(87) PCT Pub. No.: WO2014/019519
PCT Pub. Date: Feb. 6, 2014

(65) Prior Publication Data
US 2015/0165529 A1 Jun. 18, 2015

(30) Foreign Application Priority Data
Aug. 1, 2012 (CN) ................. 2012 2 0379693 U

(51) Int. Cl.
*B23B 31/165* (2006.01)
*B23B 31/12* (2006.01)

(52) U.S. Cl.
CPC ........ *B23B 31/123* (2013.01); *B23B 2231/38* (2013.01); *B23B 2260/022* (2013.01); *Y10S 279/902* (2013.01); *Y10T 279/17632* (2015.01)

(58) Field of Classification Search
CPC .............. B23B 31/1238; B23B 31/123; B23B 2231/38; B23B 2260/022;
(Continued)

(56) References Cited

U.S. PATENT DOCUMENTS 2,910,302 A * 10/1959 Ondeck ............... B23B 31/1253
279/22
3,807,745 A * 4/1974 Bent ................... B23B 31/1238
279/60
(Continued)

FOREIGN PATENT DOCUMENTS

CN 2640667 Y 9/2004
CN 1569371 A 1/2005
(Continued)

OTHER PUBLICATIONS

International Searching Authority, International Search Report for International Application No. PCT/CN2013/080562, dated Oct. 10, 2013, 6 pages, State Intellectual Property Office of the P.R.C., China.
(Continued)

*Primary Examiner* — Eric A Gates
*Assistant Examiner* — Chwen-Wei Su
(74) *Attorney, Agent, or Firm* — Alston & Bird LLP

(57) ABSTRACT

A drill chuck comprises: a drill body having a plurality of inclined guiding holes distributed evenly along a circumferential direction; a plurality of clamping jaws arranged slidably in the inclined guiding holes respectively and having external thread segments; an outer socket rotatably fitted over the drill body; and a nut engaged with the clamping jaws and connected to the out socket in a driving manner; further comprises: a locking mechanism located between a first thrust surface of the drill body and the nut and having a locking plate and locking balls, wherein an end face of the locking plate facing the nut is thereon provided with a plurality of slide grooves having a helix angle, the helix angle of the slide grooves is less than a friction angle between the locking balls and locking plate, and the locking balls are movably arranged along the slide grooves.

9 Claims, 6 Drawing Sheets

(58) Field of Classification Search
CPC ...... B23B 2260/072; B23B 2260/0725; B23B 2260/008; Y10T 279/17632; Y10T 279/32; Y10S 279/902
See application file for complete search history.

(56) References Cited

U.S. PATENT DOCUMENTS

| | | | |
|---|---|---|---|
| 5,044,643 A | | 9/1991 | Nakamura |
| 5,125,673 A | | 6/1992 | Huff et al. |
| 5,145,194 A | * | 9/1992 | Huff ................. B23B 31/123 279/140 |
| 5,215,317 A | * | 6/1993 | Jordan ............... B23B 31/1238 279/140 |
| 5,531,461 A | * | 7/1996 | Huff ................ B23B 31/1238 279/140 |
| 5,741,016 A | | 4/1998 | Barton et al. |
| 5,765,839 A | | 6/1998 | Röhm |
| 5,816,582 A | | 10/1998 | Steadings et al. |
| 6,341,783 B1 | | 1/2002 | Röhm |
| 6,390,481 B1 | | 5/2002 | Nakamuro |
| 6,991,238 B2 | | 1/2006 | Yang et al. |
| 7,185,896 B2 | * | 3/2007 | Cachod ............... B23B 31/123 279/140 |
| 7,431,308 B2 | | 10/2008 | Cachod |
| 7,527,273 B2 | | 5/2009 | Bordeianu |
| 7,900,937 B2 | | 3/2011 | Yaksich |
| 7,946,594 B2 | * | 5/2011 | Tan ................. B23B 31/123 279/140 |
| 2011/0316240 A1 | | 12/2011 | Yang |

FOREIGN PATENT DOCUMENTS

| | | |
|---|---|---|
| CN | 1931484 A | 3/2007 |
| CN | 101028655 A | 9/2007 |
| CN | 101367133 A | 2/2009 |
| CN | 202779945 U | 3/2013 |
| DE | 4438991 A1 | 5/1996 |
| EP | 0570918 | 11/1993 |

OTHER PUBLICATIONS

European Patent Office, Communication Pursuant to Rules 70(2) and 70a(2) EPC for Application No. 13826253.0, dated Jan. 11, 2016, Germany.

European Patent Office, Extended European Search Report for Application No. 13826253.0, dated Dec. 14, 2015, Germany.

* cited by examiner

DRILL CHUCK

CROSS REFERENCE TO RELATED APPLICATIONS

This application is a national stage application, filed under 35 U.S.C. §371, of International Application No. PCT/CN2013/080562, filed Jul. 31, 2013, which claims priority to Chinese Application No. 201220379693.6, filed Aug. 1, 2012, the contents of both of which are hereby incorporated by reference in their entirety.

BACKGROUND

Technical Field

The invention relates to the field of processing machinery, in particular to a drill chuck.

Description of Related Art

The current drill chucks have the function of extending clamping jaws to clamp tools and retracting clamping jaws to release tools, and are further provided with locking structures to prevent the clamping jaws loosening in the clamping positions, thereby preventing the clamping jaws loosening during operation. However, the locking structures of them are complex.

BRIEF SUMMARY

The invention aims to provide a drill chuck having a simple structure and not loosening during operation.

To achieve the objective above, according to one aspect of the invention, a drill chuck is provided, comprising: a drill body having a plurality of inclined guiding holes distributed evenly along a circumferential direction; a plurality of clamping jaws arranged slidably in the inclined guiding holes respectively and having external thread segments; an outer socket rotatably fitted over the drill body; and a nut engaged with the clamping jaws and connected to the outer socket in a driving manner; further comprising: a locking mechanism located between a first thrust surface of the drill body and the nut and having a locking plate and locking balls, wherein an end face of the locking plate facing the nut is thereon provided with a plurality of slide grooves having a helix angle, the helix angle of the slide grooves is less than a friction angle between the locking balls and the locking plate, and the locking balls are movably arranged along the slide grooves.

Furthermore, the drill chuck further comprises a nut socket fixedly connected to the nut and connected to the outer socket in a driving manner.

Furthermore, a front end of the nut socket has driven parts inwards extending along a radial direction, and a back end of the nut socket has elastic ratchets; a front end of the outer socket has driving grooves cooperating with the driven parts which have a first position and a second position in the driving grooves, and a back end of the outer socket has a first groove and a second groove cooperating with the elastic ratchets, wherein the first groove is deeper than the second groove, and when the driven parts are in the first position, the elastic ratchets are in the first groove, and when the driven parts are in the second position, the elastic ratchets are in the second groove; and the locking plate has ratchet teeth, and when in the second groove, the elastic ratchets bring into contact with the ratchet teeth.

Furthermore, the locking mechanism further comprises an elastic pad located between the first thrust surface of the drill body and the locking plate.

Furthermore, the locking mechanism further comprises an annular pad located between the locking balls and the nut and movably arranged along an axial direction of the drill body.

Furthermore, the drill body has a second thrust surface located between the first thrust surface and the nut and facing the nut, and the annular pad brings contact with the second thrust surface.

Furthermore, an inner wall of the annular pad has a limit surface to prevent the annular pad from rotating around the drill body.

Furthermore, the locking mechanism further comprises a bearing located between the annular pad and the nut.

Furthermore, the nut has a support groove in which the bearing is located.

By the technical solution of the invention and the locking mechanism in a simple structure, when the clamping jaws are in the clamping position and tend to loosen, the locking plate and the locking balls in the locking mechanism can compress the clamping jaws tightly to prevent the clamping jaws from loosening and increase the clamping firmness of the clamping jaws.

BRIEF DESCRIPTION OF THE FIGURES

The specification and drawings constituting one part of the application are to provide further understanding of the invention, and the exemplary embodiments of the invention and the explanations thereof are intended to explain the invention, instead of improperly limiting the invention. In the drawings.

DETAILED DESCRIPTION OF VARIOUS EMBODIMENTS

The invention will be described below in detail with reference to the drawings and in combination with the embodiments. It should be noted that, in the case of no conflict, the embodiments of the application and features therein can be combined with one another.

Figure 1:
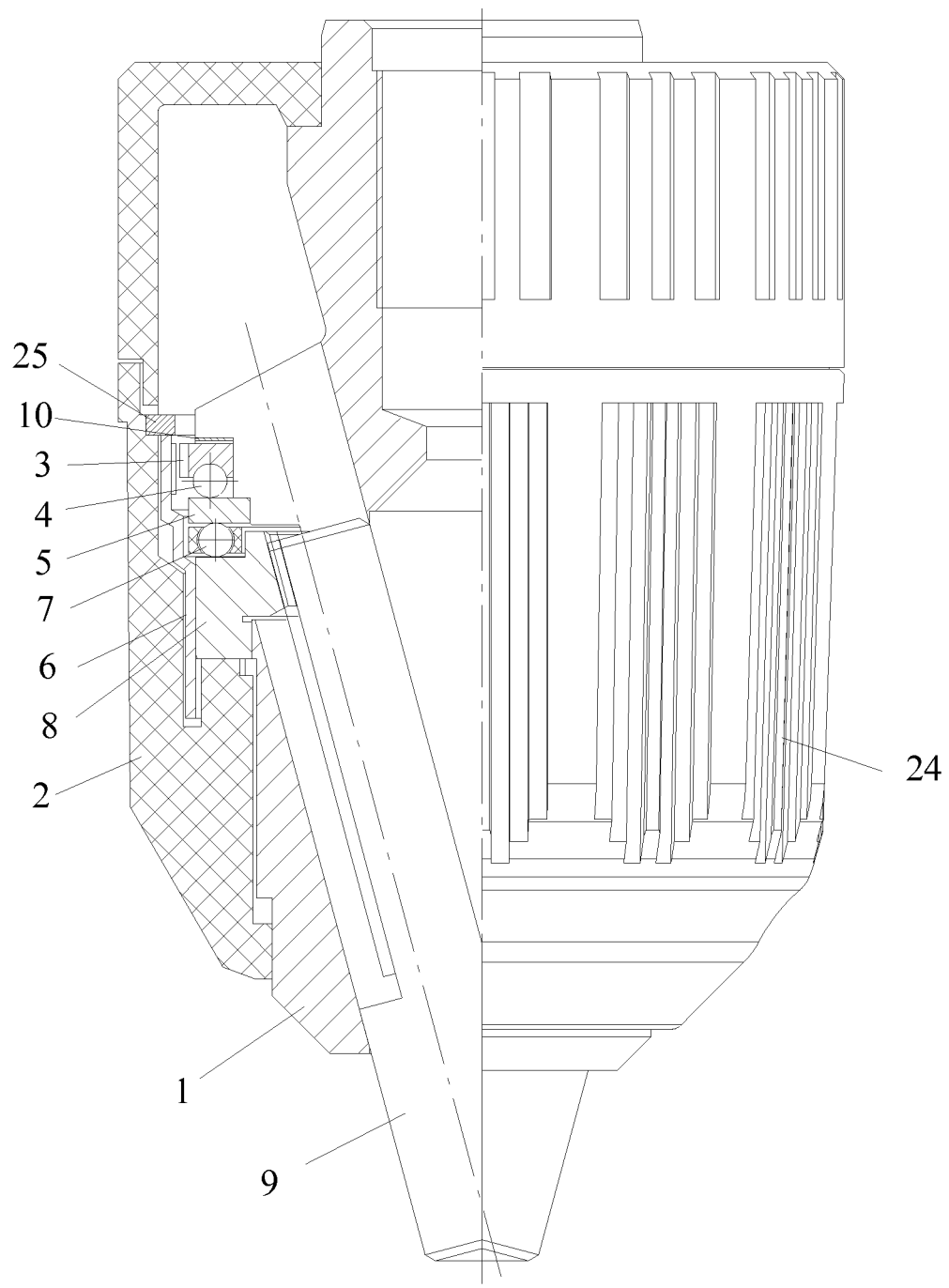
FIG. 1 is a diagram showing a drill chuck according to one embodiment of the invention.

As shown in FIG. 1, according to one embodiment of the invention, a drill chuck is provided, comprising: a drill body 1, clamping jaws 9, an outer socket 2, a nut 8, a nut socket 6 and a locking mechanism. A plurality of inclined guiding holes are evenly distributed along a circumferential direction in the drill body 1, with the front ends open.

Figure 2:
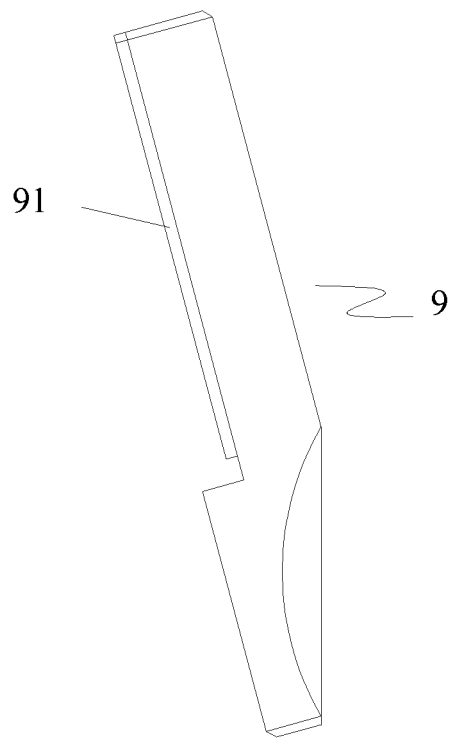
FIG. 2 is a diagram showing a clamping jaw according to one embodiment of the invention.

With reference to FIG. 2, a plurality of clamping jaws 9 are arranged with respect to the inclined guiding holes respectively and can slide along the inclined direction of the inclined guiding holes. Each clamping jaw has an external thread segment 91. The clamping jaw has a clamping position extending from the front end of one inclined guiding hole and a loosening position retracting to the inclined guiding hole. When in the clamping position, the front ends of the clamping jaws 9 get close to one another to clamp tools. When in the loosening position, the front ends of the clamping jaws 9 keep away from one another to release tools.

Figure 3:
FIG. 3 is a diagram showing a nut according to one embodiment of the invention.

With reference to FIG. 3, the nut 8 is fitted over the clamping jaws 9 and engaged with the external thread segments to drive the clamping jaws 9 to extend from or retract to the inclined guiding holes.

Figure 4:
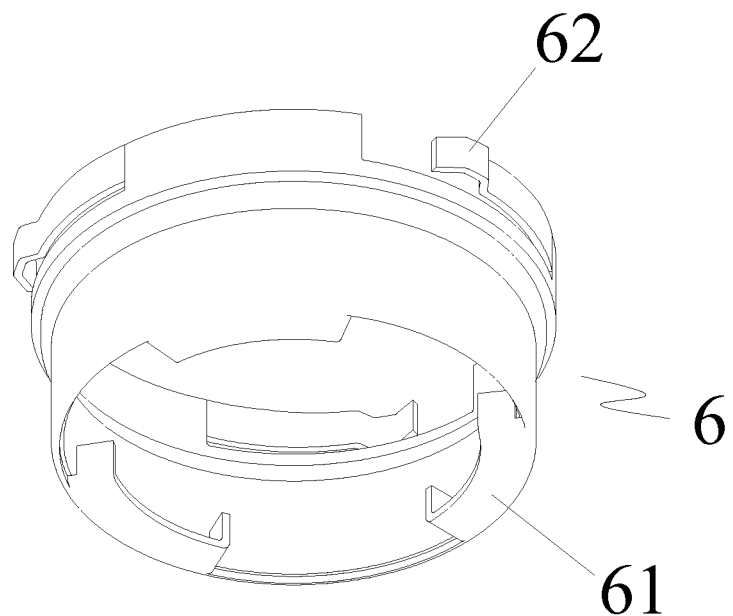
FIG. 4 is a diagram showing a nut socket at one angle according to one embodiment of the invention.
Figure 5:
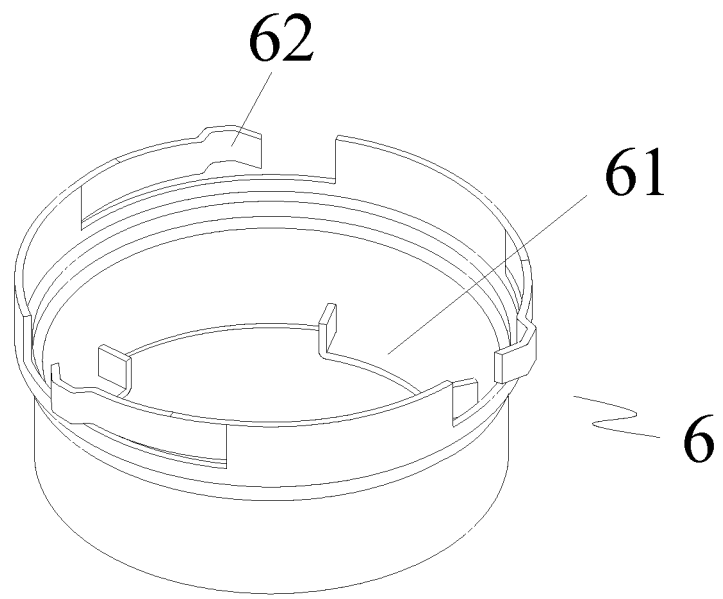
FIG. 5 is a diagram showing a nut socket at another angle according to one embodiment of the invention.

With reference to FIGS. 4 and 5, the nut socket 6 is fitted over the nut 8 and in interference fitting with the nut 8, thereby being incapable of rotating relatively. The front end of the nut socket 6 has a plurality of driven parts 61 extending along a radial direction, and the back end of the nut socket 6 has a plurality of elastic ratchets 62 capable of retracting along a radial direction.

Figure 6:
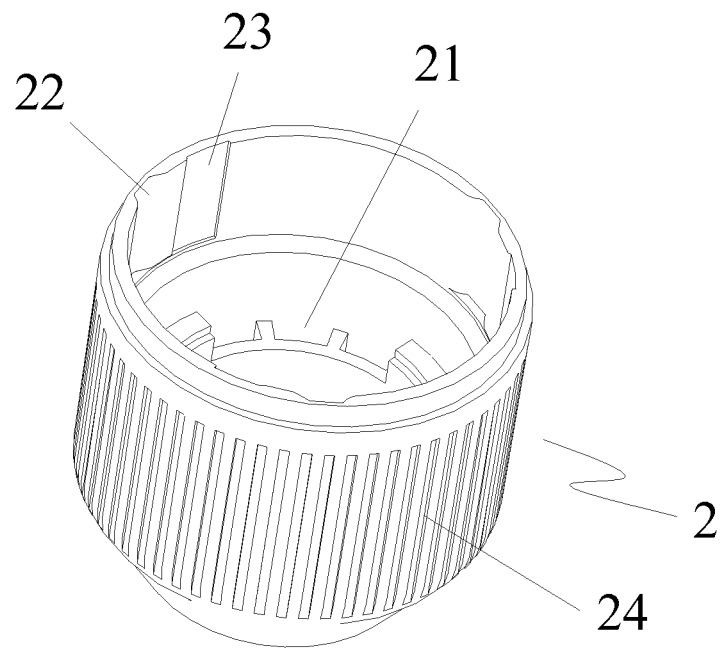
FIG. 6 is a diagram showing an outer socket at one angle according to one embodiment of the invention.
Figure 7:
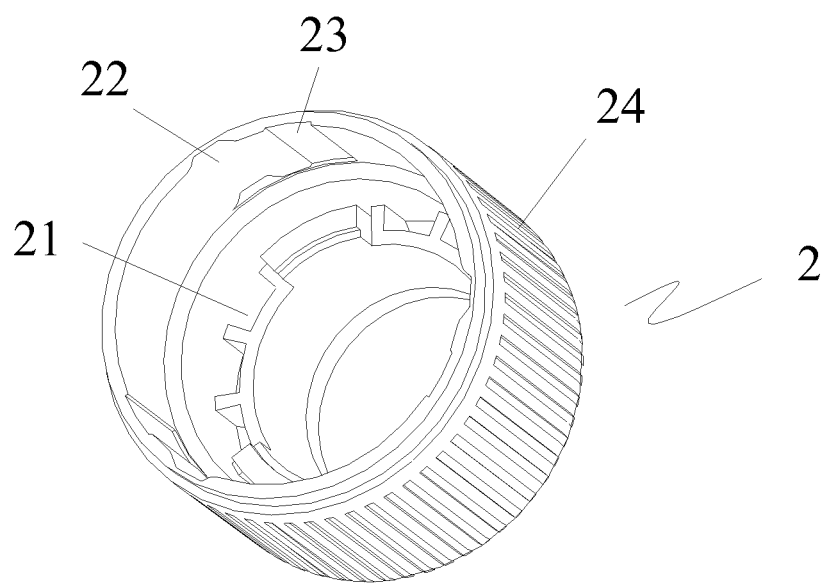
FIG. 7 is a diagram showing an outer socket at another angle according to one embodiment of the invention.

With reference to FIGS. 6 and 7, the outer socket 2 is fitted over the drill body 1 and can rotate around the central axis of the drill body 1. The outer socket 2 is connected to the nut socket 6 in a driving manner. The front end of the outer socket 2 has a plurality of driving grooves 21 cooperating with the driven parts 61 to form a spine structure. The driven parts 61 can move in the driving grooves 21 and have a first position and a second position in the driving grooves 21 respectively. The back end of the outer socket 2 has a first groove 22 and a second groove 23, and the first groove 22 is deeper than the second groove 23, wherein the elastic ratchets are selectively located in the first groove 22 or second groove 23. When the driven parts are in the first position, the elastic ratchets 62 are in the first groove 22. When the driven parts 61 are in the second position, the elastic ratchets 62 are in the second groove 23 and inwards shrink along a radial direction.

To facilitate the rotation of the outer socket 2, the outer wall of the outer socket 2 has a skid-proof part 24 extending along an axial direction of the drill body 1.

To facilitate the positioning of the nut socket 6, the outer socket 2 therein has a positioning spring 25 bringing into contact with the nut socket 6.

Figure 8:
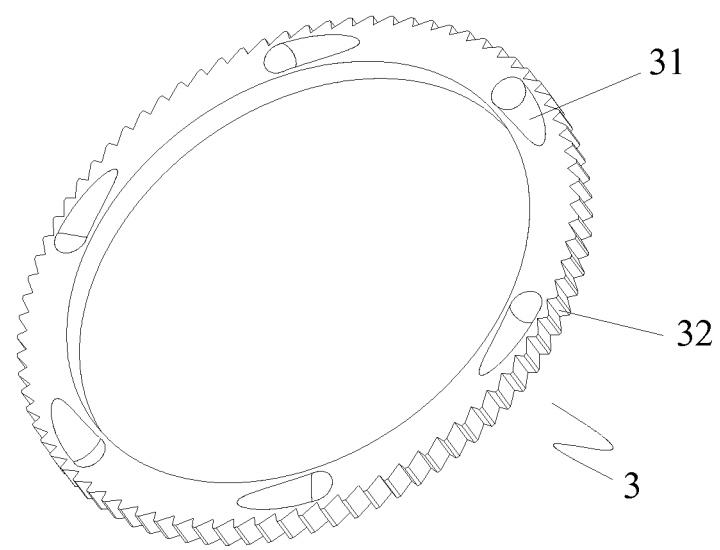
FIG. 8 is a diagram showing a locking plate according to one embodiment of the invention.

With reference to FIG. 8, the locking mechanism is located between the first thrust surface of the drill body 1 and the nut 8 to prevent the clamping jaws 9 in the clamping position from loosening, so that the clamping jaws 9 are closed more firmly and reliably. The locking mechanism comprises a locking plate 3 and locking balls 4 arranged from the first thrust surface to the nut 8 in turn, and the locking balls 4 are preferably steel balls. The periphery of the locking plate has a plurality of ratchet teeth 32, and when in the second groove 23, the elastic ratchets 62 inwards contract along a radial direction to bring into contact with the tooth grooves of the ratchet teeth 32. An end face of the locking plate 3 facing the nut 8 has a plurality of slide grooves 31, and the locking balls 4 are movably arranged in the slide grooves 31. The slide grooves 31 have a helix angle which are greater than that of the inner thread of the nut 8, so that the locking plate 3 can push the locking balls 4 to move to the far end of the slide grooves 31, thereby compressing the nut 8 and clamping jaws 9 and preventing the clamping jaws 9 from loosening. Meanwhile, the helix angle is less than the friction angle between the locking balls 4 and the locking plate 3 to realize the self-locking function of the locking balls 4.

Figure 9:
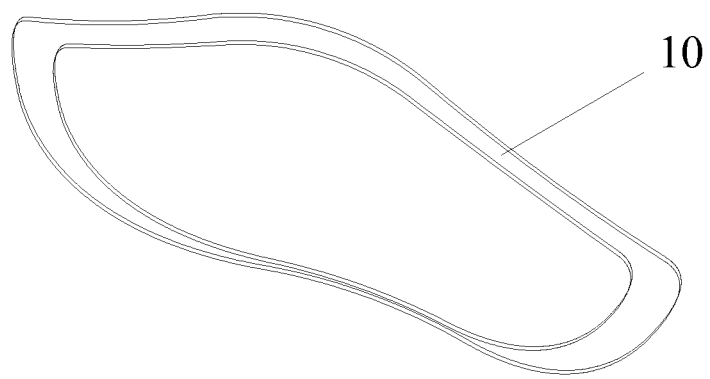
FIG. 9 is a diagram showing an elastic pad according to one embodiment of the invention.

With reference to FIG. 9, the locking mechanism further comprises an elastic pad 10 located between the first thrust surface of the drill body 1 and the locking plate 3. The elastic pad 10 is configured to compress the locking plate 3.

Figure 10:
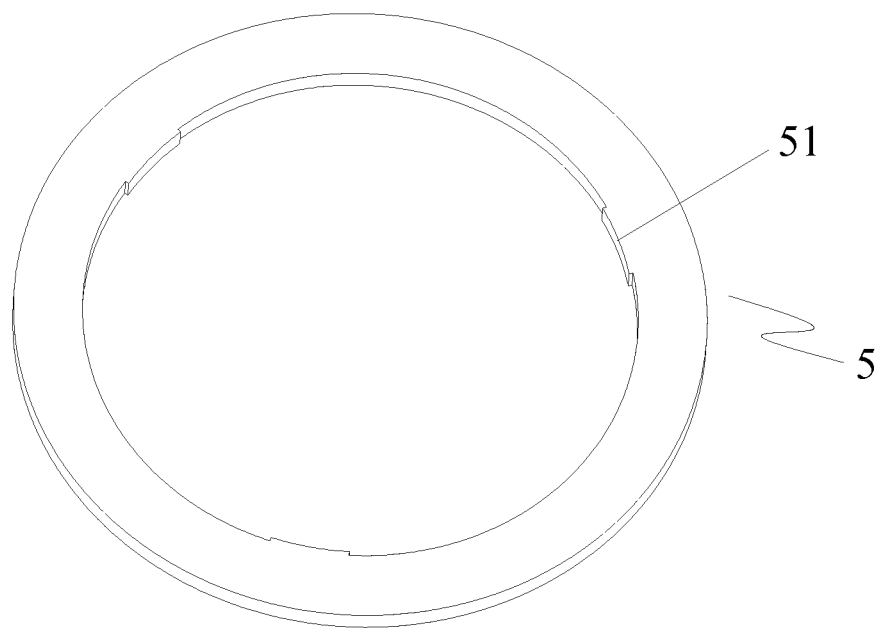
FIG. 10 is a diagram showing an annular pad according to one embodiment of the invention.

With reference to FIG. 10, the locking mechanism further comprises an annular pad 5 located between the locking balls 4 and the nut 8 and incapable of rotating around the drill body 1 but can move along an axial direction of the drill body 1. To better position the annular pad 5, a second thrust surface facing the nut 8 is arranged between the first thrust surface of the drill body 1 and the nut 8, and the annular pad 5 brings into contact with the second thrust surface. To prevent the annular pad 5 from rotating, the inner wall of the annular pad 5 has a plurality of limit surfaces 51 cooperating with the inclined guiding holes respectively, so that the elastic pad 5 cannot move circumferentially.

To reduce the resistance and increase the torque input, the locking mechanism further comprises a bearing 7 located between the annular pad 5 and the nut 8. The back end face of the nut 8 has a support groove with a L-shaped section, in which the bearing 7 is located to realize the radial positioning.

When the drill chuck is tightened, the outer socket 2 drives the nut socket 6 to forward rotate, thereby locating the elastic ratchets 62 in the second groove 23 and compressing them to inwards contract and bring into contact with the ratchet teeth 32 on the locking plate 3, so that the nut socket 6 drives the locking plate 3 to rotate in the same direction and push the locking balls 4 to move to the far end of the slide grooves 31 until the clamping jaws 9 extend and are in the clamping position.

If the clamping jaws 9 tend to loosen in the clamping position, the nut socket 6 backward rotates to drive the locking plate 3 to rotate in the same direction, so that the locking balls 4 move to the near ends of the slide grooves 31 in order to apply a compression force on the annular pad 5. Because the elastic pad 10 always compresses the locking plate 3, the locking balls 4 always compress the annular pad 5. The compression force is transmitted to the clamping jaws 9 through the bearing 7 and the nut 8 to close the clamping jaws 9 more tightly, thereby preventing loosening. When the clamp jaws 9 are locked tightly, the locking plate 3 cannot rotate any more.

It can be seen from the description above that the embodiment of the invention realizes the following technical effect that: with the locking mechanism in a simple structure, when the clamping jaws are in the clamping position and tend to loosen, the locking plate and locking balls in the locking mechanism can compress the clamping jaws tightly to prevent the clamping jaws from loosening and increase the clamping firmness of the clamping jaws.

The above are only preferred embodiments of the invention and not used for limiting the invention. For those skilled in the art, the invention may have various modifications and changes. Any modifications, equivalent replacements, improvements and the like within the spirit and principle of the invention shall fall within the scope of protection of the invention.

The invention claimed is:
1. A drill chuck, comprising:
a drill body having a plurality of inclined guiding holes distributed evenly along a circumferential direction;

a plurality of clamping jaws arranged slidably in the inclined guiding holes respectively and having external thread segments;

an outer socket rotatably fitted over the drill body; and a nut engaged with the clamping jaws and connected to the outer socket in a driving manner;

further comprising:

a locking mechanism located between a first thrust surface of the drill body and the nut and having a locking plate and locking balls, wherein an end face of the locking plate facing the nut is thereon provided with a plurality of slide grooves having a helix angle, the helix angle of the slide grooves is less than a friction angle between the locking balls and the locking plate, and the locking balls are movably arranged along the slide grooves;

the locking mechanism further comprising an annular pad located between the locking balls and the nut and movably arranged along an axial direction of the drill body, and wherein an inner wall of the annular pad has at least one limit surface to prevent the annular pad from rotating around the drill body.

2. The drill chuck according to claim 1, further comprising:

a nut socket fixedly connected to the nut and connected to the outer socket in a driving manner.

3. The drill chuck according to claim 2, wherein a front end of the nut socket has driven parts inwards extending along a radial direction, and a back end of the nut socket has elastic ratchets;

a front end of the outer socket has driving grooves cooperating with the driven parts which have a first position and a second position in the driving grooves, and a back end of the outer socket has a first groove and a second groove cooperating with the elastic ratchets, wherein the first groove is deeper than the second groove, and when the driven parts are in the first position, the elastic ratchets are in the first groove, and when the driven parts are in the second position, the elastic ratchets are in the second groove; and the locking plate has ratchet teeth, and when in the second groove, the elastic ratchets bring into contact with the ratchet teeth.

4. The drill chuck according to claim 3, further comprising an elastic pad located between the first thrust surface of the drill body and the locking plate.

5. The drill chuck according to claim 2, further comprising an elastic pad located between the first thrust surface of the drill body and the locking plate.

6. The drill chuck according to claim 1, further comprising an elastic pad located between the first thrust surface of the drill body and the locking plate.

7. The drill chuck according to claim 1, wherein the drill body has a second thrust surface located between the first thrust surface and the nut and facing the nut, and the annular pad brings contact with the second thrust surface.

8. The drill chuck according to claim 1, further comprising a bearing located between the annular pad and the nut.

9. The drill chuck according to claim 8, wherein the nut has a support groove in which the bearing is located.

* * * * *